(12) United States Patent
Oberle et al.

(10) Patent No.: US 9,542,484 B2
(45) Date of Patent: Jan. 10, 2017

(54) UPDATING ONTOLOGY WHILE MAINTAINING DOCUMENT ANNOTATIONS

(75) Inventors: Daniel Oberle, Durmersheim (DE); Stefan Scheidl, Dieburg (DE)

(73) Assignee: SAP SE, Walldorf (DE)

( * ) Notice: Subject to any disclaimer, the term of this patent is extended or adjusted under 35 U.S.C. 154(b) by 1385 days.

(21) Appl. No.: 12/569,800

(22) Filed: Sep. 29, 2009

(65) Prior Publication Data

US 2011/0078215 A1 Mar. 31, 2011

(51) Int. Cl.
*G06F 17/30* (2006.01)
(52) U.S. Cl.
CPC .............................. *G06F 17/30734* (2013.01)
(58) Field of Classification Search
CPC ................................................ G06F 17/30734
See application file for complete search history.

(56) References Cited

U.S. PATENT DOCUMENTS

| | | | |
|---|---|---|---|
| 2002/0059289 A1* | 5/2002 | Wenegrat et al. | 707/102 |
| 2004/0015378 A1* | 1/2004 | Casati et al. | 705/7 |
| 2005/0198202 A1 | 9/2005 | Yamamoto | |
| 2005/0210059 A1 | 9/2005 | Albornoz et al. | |
| 2006/0136353 A1 | 6/2006 | Crockett et al. | |
| 2006/0173868 A1* | 8/2006 | Angele et al. | 707/100 |
| 2006/0195783 A1* | 8/2006 | Davis et al. | 715/513 |
| 2007/0118357 A1* | 5/2007 | Kasravi et al. | 704/10 |
| 2008/0097968 A1* | 4/2008 | Delgado et al. | 707/3 |
| 2008/0201632 A1 | 8/2008 | Hong et al. | |
| 2009/0106208 A1* | 4/2009 | Matellanes et al. | 707/3 |
| 2009/0132907 A1 | 5/2009 | Shao et al. | |
| 2010/0153835 A1 | 6/2010 | Xiong et al. | |
| 2010/0185700 A1* | 7/2010 | Bodain | 707/803 |
| 2010/0228693 A1* | 9/2010 | Dawson et al. | 706/12 |

OTHER PUBLICATIONS

Handschuh et al. "Authoring and Annotation of Web Pages in CREAM", WWW2002, May 7-11, 2002, Honolulu, Hawaii, USA.*
Kahan et al. "Annotea: An Open RDF Infrastructure for Shared Web Annotations", WWW10, May 1-5, 2001 Hong Kong.*
"U.S. Appl. No. 12/336,940, Examiners Interview Summary mailed Dec. 1, 2011", 4 pgs.
"U.S. Appl. No. 12/336,940, Final Office Action mailed Sep. 21, 2011", 24 pgs.
"U.S. Appl. No. 12/336,940, Non Final Office Action mailed Apr. 1, 2011", 30 pgs.

(Continued)

*Primary Examiner* — Shew-Fen Lin
(74) *Attorney, Agent, or Firm* — Schwegman Lundberg & Woessner, P.A.

(57) ABSTRACT

In a computer system, an ontology is derived from an original data source, such as from an relational database. At any time, a user can relate useful information to an ontology node, for example, by entering a document annotation into the ontology. Later, the user can retrieve the information through the annotation and view the document together with the ontology. An ontology update scheme keeps the document annotation available even if changes in the original data would remove the corresponding portions of the ontology. In the ontology, the scheme moves the annotations from a first ontology node to a second ontology node, by following a pre-defined change pattern.

6 Claims, 5 Drawing Sheets

(56) References Cited

OTHER PUBLICATIONS

"U.S. Appl. No. 12/336,940, Response filed Jun. 28, 2011 to Non Final Office Action mailed Apr. 1, 2011", 15 pgs.
"U.S. Appl. No. 12/336,940, Respoonse filed Jun. 28, 2011 to Non Final Office Action mailed Apr. 1, 2011", 15 pgs.
Denoue, et al., "An annotation tool for Web Browsers and its applications to information retrieval", Proceedings of RIAO 2000, Sixth Conference on Content Based Multimedia Information Access, Paris, France, (Apr. 2000).
Derose, et al., "XML Pointer Language (XPointer), W3C Working Draft", http://www.w3.org/TR/1999/WDxpt, (Dec. 199).
Kahan, J., et al., "Annotea: an open RDF infrastructure for shaedWeb annotations", Computer Network 39, (2002), 589-608.
Kurniawan, Budi, "Cross-Browser Layers, Part One", [Online]. Retrieved from the Internet: <URL:http://www.oreillynet.com/pub/a/javascript/2001/05/25/layers_partone.html>, (May 25, 2001), 9 pgs.
Phelps, et al., "Robust intra-document locations", Computer Networks, vol. 33, Issue 1-6,, (Jun. 2008), 105-118.
Willison, et al., "Building a decentralized collaborative annotation system for the World-Wide Web", University of Bath, (May 2005).

\* cited by examiner

| SELECT NODE RULE FOR SOURCE UPDATE |
|---|
| move link to parent |
| move link to root |
| remove link |
| keep node and flag as expired |
| decide case by case |

UPDATING ONTOLOGY WHILE MAINTAINING DOCUMENT ANNOTATIONS

TECHNICAL FIELD

The present disclosure generally relates to computer systems, and more in particular relates to computer systems that interact with users to change the structure of data.

BACKGROUND

In enterprises, governments, or organizations in general, effective data processing is one of the key success factors. Data processing has a first aspect: to present data in an appropriate form to users. Users may not necessarily be familiar with data processing technology; for example, users would not be able to directly access a database. Even in current enterprise resource planning (ERP) systems, obtaining information is often difficult for untrained users. Users need to be empowered to derive relevant information from data that is presented in an easy-to-operate user interface.

There is a second aspect of data processing: to let users operate on copied data instead of original data, which may be desirable for various reasons, such as for example, to avoid inadvertently modifying original data. With the established technique called ontology lifting, original data is copied into a hierarchical data structure, the ontology, which is convenient for users in its flexibility since an ontology applies modeling primitives that are near to human cognition (typically classes and relations).

DETAILED DESCRIPTION

Embodiments may present data to a user in the form of an ontology that is derived from an original source, such as from a database. At any time, the user may relate useful information to an ontology node, for example, by entering a document annotation into the ontology Later, the user can retrieve the information through the document annotation, and in viewing the document together with the ontology, the user can make an informed decision.

An ontology update mechanism of an example embodiment keeps the document annotation available even if changes in the original data would remove the corresponding portions of the ontology. In other words, even when updates in the original data may require lifting of the ontology again, the intellectual value that users earlier created within the ontology (e.g., document annotations, notes, document links, web links, directories, references and the like) is preserved.

Figure 2:
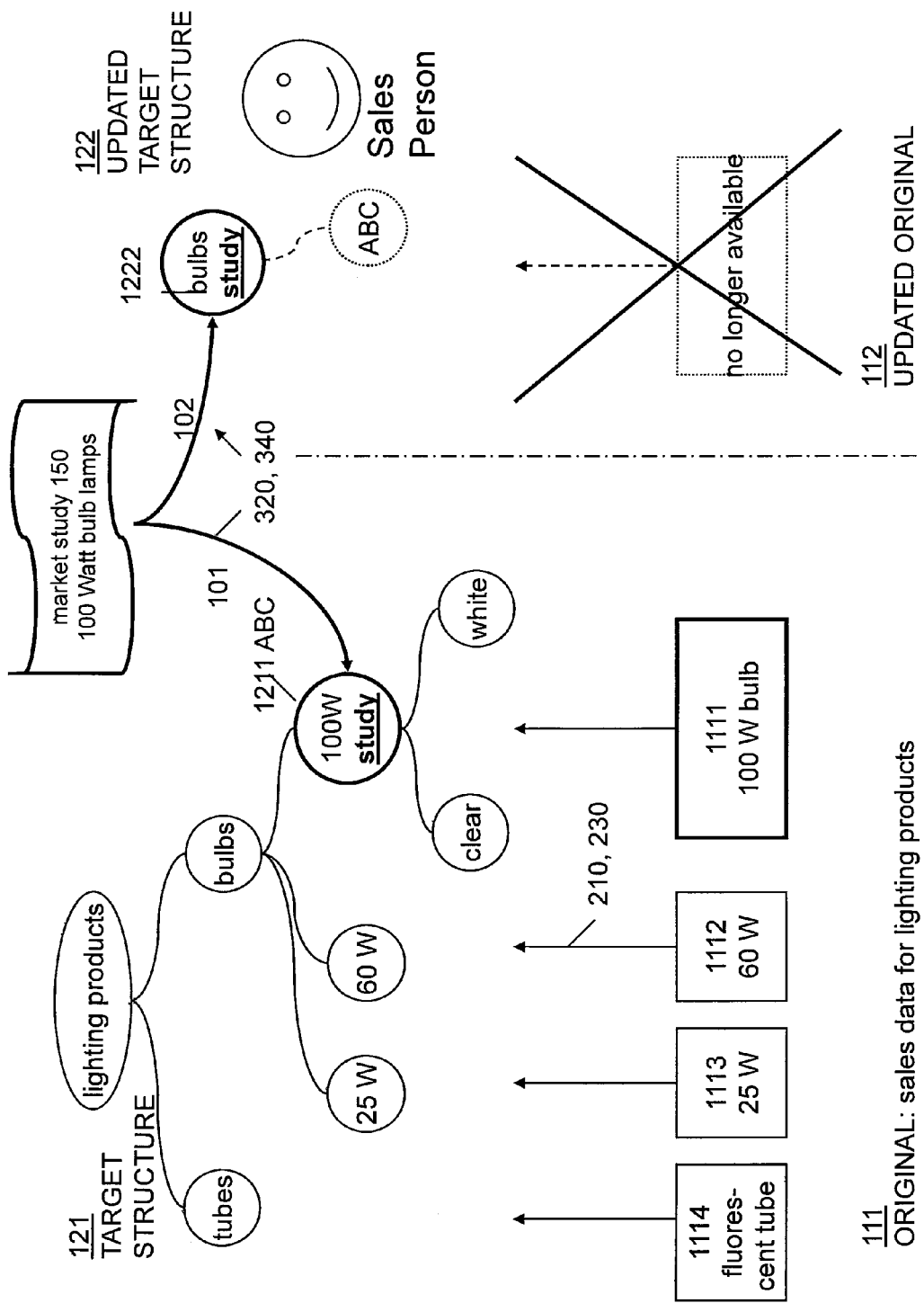
FIG. 2 is a simplified block diagram of original and target structures, according to an example embodiment, as well as relations of the document in view of an exemplary scenario.
Figure 3:
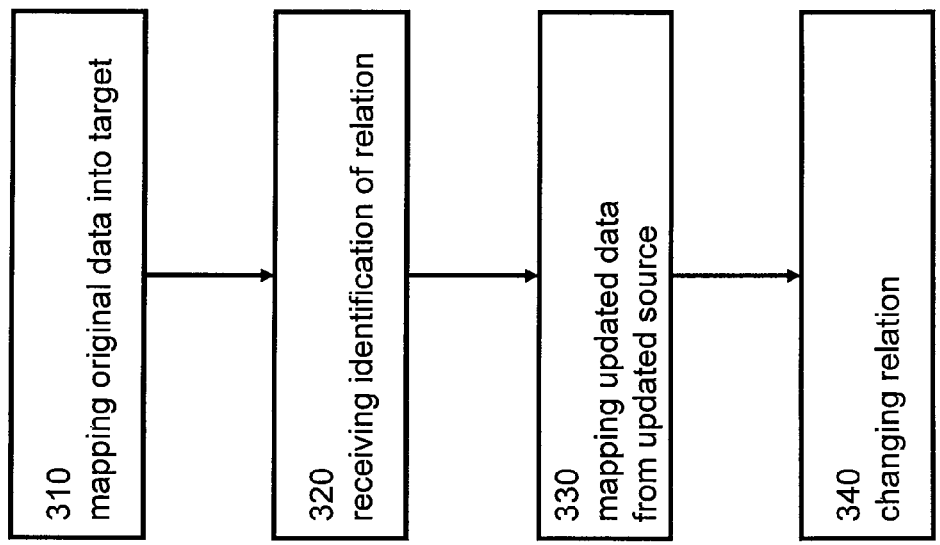
FIG. 3 is a flow chart diagram of a method of an example embodiment.
Figure 4:
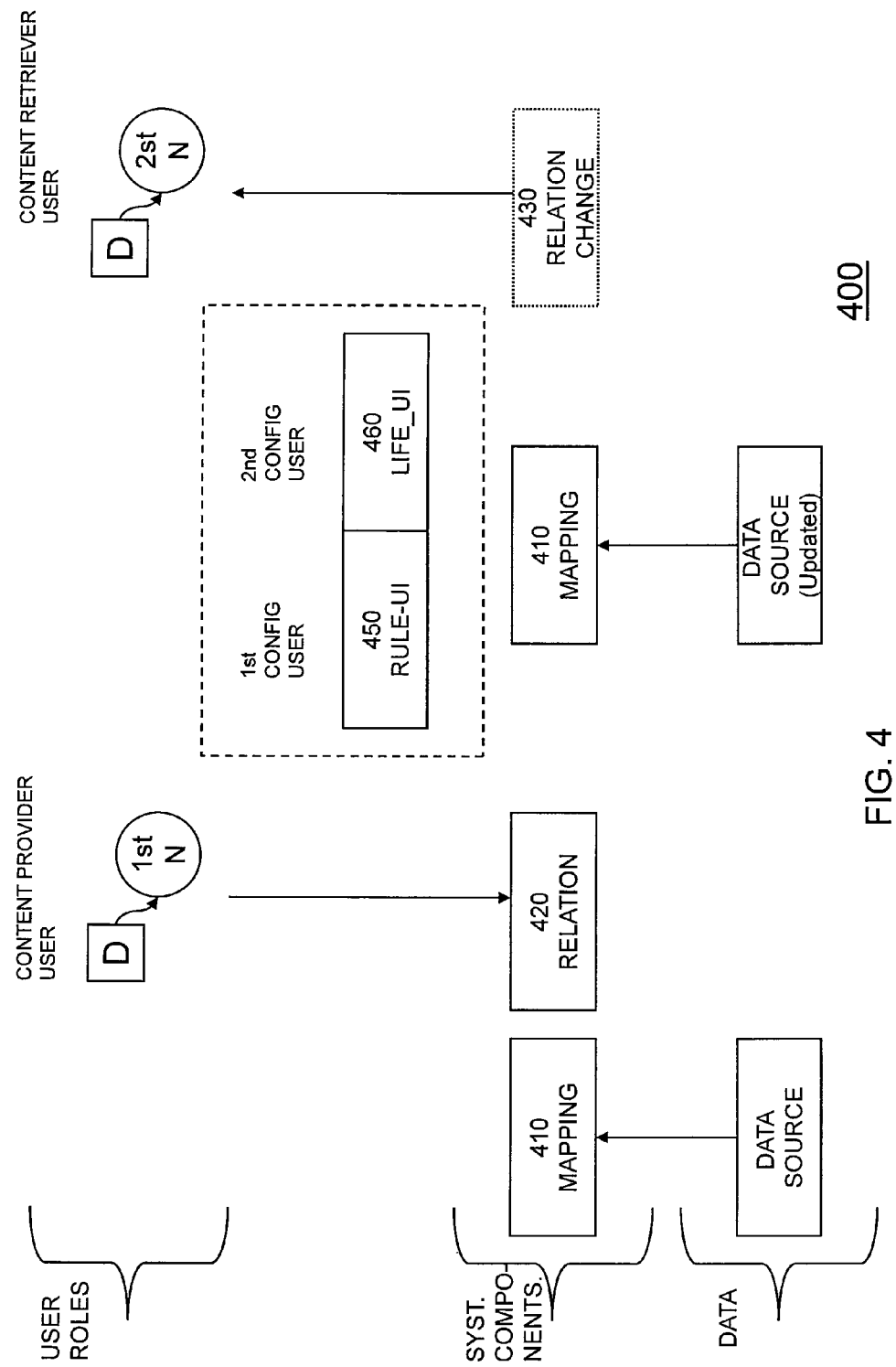
FIG. 4 is a block diagram of a computer system, configured according to an example embodiment; an FIG. 5 is a view of a user interface, according to an example embodiment, for a configuration user to select a node assignment scheme.

In a first part, the description starts with an overview (FIG. 1) and shows the ontology as a target data structure that maintains links to documents. The description then continues with an explanation of an exemplary scenario (FIG. 2) and refers to a method and a computer system (FIGS. 3-4).

In a second part, the description addresses a further embodiment that involves user interaction during updates and prior to updates. These are strategies to keep the links within the updated target structure (FIG. 5).

Figure 1:
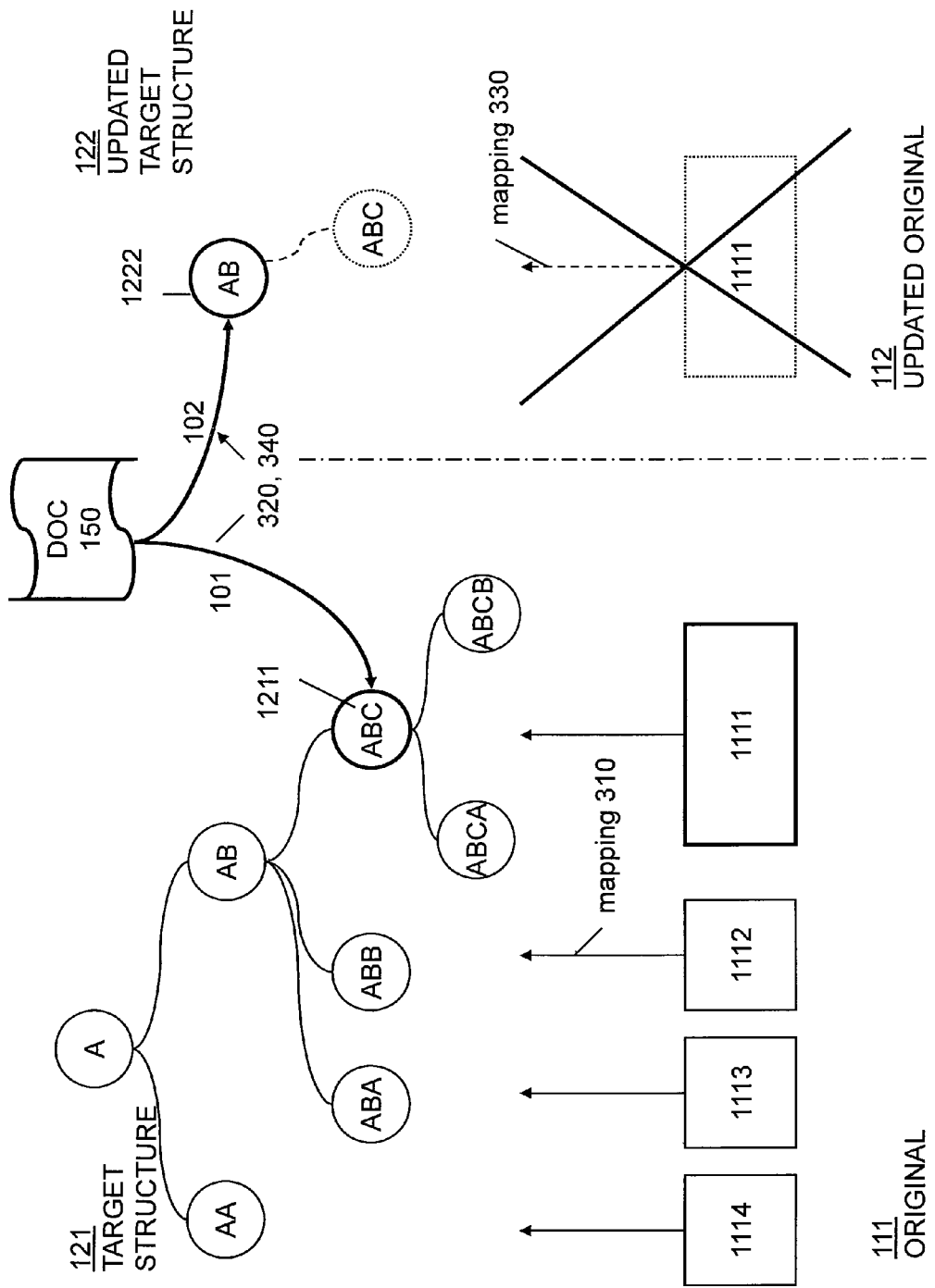
FIG. 1 is a block diagram of original and target structures as well as relations of a document to illustrate an overview of an example embodiment.

FIG. 1 is a block diagram of original and target structures, as well as relations of a document, to illustrate an overview of the example embodiment For convenience herein, mapping data from the original structure to the target structure is illustrated vertically, and by references that change the digit in the center (111/121, 112/122). Updating data is illustrated from the left to the right, and by references that change the digit on the right (101/102, 111/112, 121/122). References to 310, 320, 330, and 340 refer to method operations of FIG. 3

Looking to the figure vertically, rectangles illustrate elements of an original data source 111, such as database entries; circles illustrate nodes in a target structure 121/122 that can be presented as an ontology to a user. Thin lines between the nodes illustrate hierarchy. Arrows from the rectangles to the circles illustrate mapping (cf. operations 310-330 in FIG. 3), for example, element 1111 to node ABC, element 1112 to node ABB, element 1113 to node ABA, and element 1114 to node AA.

The inter-node hierarchy is based on information in the elements (1111-1114) and is created during mapping. It is convenient to store the ontology (structure 121/122) in memory that is separate from the memory of the original data source 111.

Document 150 is usually outside the scope of original data source 111 and outside of the ontology and contains information that is not available in the original data and in the just-mapped ontology Looking at the memory, the document may be stored outside of the original data (111) in both its original (111) and updated (112) versions.

A user in the role of a content provider can use a commercially or otherwise available ontology editor and introduce relation 101 (symbolized by bold arrow, operation 320) of document 150 with a first node 1211 (e.g., ABC). In other words, the user enters a document annotation into the ontology There are many ways for the user to establish the relation, for example, (i) by adding a link into the node 1211 that leads to the document 150, (ii) by writing the relevant information into the node 1211 so that the content of the document 150 and the ontology are stored on the same memory; or (iii) otherwise.

The use of the ontology addresses the above-mentioned aspects to present data in an appropriate form and to let the user operate on copied data. Looking from the left side of the dash-dot line to the right side of FIG. 1, the updated original data source 112 no longer includes element 1111. The consequence is that data element 1111 (from original data source 111) (still mapped to the first node 1211) is no longer available in updated data source 112.

According to one example embodiment, during mapping 330 updated data (from updated data source 112) into updated target structure 122, the relation 101 of document 150 is changed (operation 340) to second node 1222 (e.g., AB) in updated target structure 122. The new relation is symbolized by arrow 102: The document is now related to second node 1222 (in the example, node 1222 is parent to node 1211). There is no user interaction needed for this change; embodiments involving user interaction will be explained in the second part of the description.

In other words, an ontology update mechanism of an embodiment keeps the document annotation available (even if changes in the original data would remove the corresponding portions of the ontology). It is advantageous for a user in the role of a content retriever that the document 150 remains related and can be identified again FIG. 2 is a block diagram of original and target structures, according to some example embodiments, as well as relations of the document to illustrate the overview in view of an exemplary scenario.

Consider an example scenario in which an enterprise is marketing lighting products. Among these products there are traditional incandescent lamps (or bulbs) and energy-saving fluorescent tubes Original data in an original data source 111 comprises sales data, sales conditions, customer information etc. for bulbs with 100 Watt power rating (data element 1111), with 60 Watt power rating (data element 1112), with 25 Watt power rating (data element 1113), as well as for the tubes (data element 1114). Original data source 111 is available in an enterprise resource management/planning (ERP) database.

When creating the ontology—e.g., target structure 121—the elements of original data source 111 are mapped into target structure 121 as follows: bulbs with 100 Watt power rating (data element 1111) to node ABC (data element 1211), with 60 Watt power rating (data element 1112) to node ABB, with 25 Watt power rating (data element 1113) to node ABA, as well as for tubes (data element 1114) to node AA. The hierarchy is mapped (cf. operation 310 in FIG. 3) by distinguishing bulbs (nodes AB and sub-nodes) from tubes (node AA). Also, differences between, for example, different glass coating of the 100 Watt type of bulb can be expressed by sub-nodes ABCB ("white") and ABCA ("clear") to ABC.

In the example embodiment, users of an exemplary system may be sales persons of an enterprise. The users may operate an ontology viewer to navigate through the lighting products and other hierarchies. The nodes are conveniently labeled with a meaning (e.g., node ABC is labeled "100 Watt bulbs"). Ontology viewers may be enabled to make annotations to the ontology. One of the users may act as a content provider and add a document 150, for example a market study for 100 Watt bulbs, and annotate the node ABC ("100 W Bulbs") with a link to document 150. These actions may correspond to the operation of receiving an identification of the relation of document 150 (e.g. the market study), and the first node (e.g., node 1211, in target structure 121) in the example is node ABC. The figures illustrate that node ABC displays underscored "study".

At the end of the year, by which time users might have forgotten about the market study, data source 112 is updated. Information about the tubes and most of the bulbs remains unchanged, but there is a variation: Due to legal and market requirements to shift to energy-saving products, the 100 Watt bulbs are no longer offered for sale. O. In terms of the figure, for data element 1111 (crossed out) in updated target structure 122, a node would not be available and mapping (operation 330 in FIG. 3) would lead to a missing node.

Traditional ontology lifting (e.g., that follows the source update) would remove the link to document 15. However, the example embodiment saves document 150 (with the market study) from being ignored (and potentially lost). The second node 1222 (in this example, the parent node AB is assigned to that document 150 as a replacement. Users can now retrieve the market study under "bulbs" (with the underscored link to "study").

In other words, the sales person can still benefit from a potentially important document that relates to items that will disappear (e.g. the 100 W bulbs), this document itself selling information who to deal with the changed market situation FIG. 3 is a flow chart diagram of method 300, according to an example embodiment, that is performed with processor and memory of a computer. References to FIGS. 1 and 2 are given in parentheses In a mapping operation 310, an original data source (111) is mapped into a target structure (121) with nodes (A, AA . . . ABCB) so that an element (1111) of the original data source (111) is mapped to a first node (1211, ABC). In other words, the knowledge stored in a database is acquired into the ontology.

In receiving operation 320, an identification of a relation (101) of a document (150) with the first node (1211) in the target structure (121) is received, for example by interaction with the user.

In mapping operation 330, updated data (112) from the updated data source (112) is mapped into an updated target structure (122).

In changing operation 340, the relation (101/102) of the document (150) is changed to a second node (1222, AB) in the updated target structure (122), for data elements (1111) from the original data source (111) that are mapped to the first node (1211) but that are not available in the updated data source (112). In other words, while the original source-to-target mapping (i.e., cf. 111 to 121 left side of FIGS. 1-2) allows to maintain a relation of the document to the first node (1211); mapping operation 330 on updated data (e.g., 112 to 122 right side of FIGS. 1-2) would prevent the this relation to be maintained. Therefore the relation is changed to a second node (in the updated target structure 122).

There are several options to identify the second node in changing operation 340. For example, the second node (1222) can be the parent node (AB) of the first node (1211), or the second node (1222) can be the root node (A) of the first node (1211).

Alternatively, as it will be explained with more detail in the second part of this description, the computer can change the nodes according to a node assignment scheme, or with user interaction during mapping.

Further, discarding a relation to the first node (1211) is also possible. Or, changing the relation (101) of the document (150) to a second node (1222, AB), as in changing operation 340, can result in the second node (1222) corresponding to the first node 1211), but that the second node (1222) receives an expiration indication (e.g. a time limit) indicating that, for example, the validity of the document (150) is expired or will expire.

FIG. 4 is a block diagram of computer system 400, which may be configured according to example embodiment. System 400 may, in the example embodiment, be implemented by processor and memory. A computer program gives the instructions to configure the computer system, and execute the methods described herein. Data structures may be conveniently stored in memory as well. Persons of skill in the art can implement the system 400 in other configurations, for example, with multiple processors and distributed components.

Since at different points in time, different system components communicate with different user roles, the figure concentrates on showing the components in the manner of a time diagram, from left to right. The components are implemented with processor, memory, and at least partly with user interfaces and connectors to data sources. It is convenient that the components are implemented on a single physical computer, but the components can also be implemented as computer services that are called when needed.

The content provider user enters content, for example, by establishing a link between the first node (1st N) and a document (D), as in the example above by identifying the sales document for 100 Watt bulbs. At a later point in time, the content retriever user benefits by reading the document (D) from its relation to the second node (2nd N)

The dashed box refers to optional components to be explained below.

More in detail, computer system 400 comprises mapping component 410, a relation component 420, and relation change component 430.

Mapping component 410 receives original data (cf. 111) from a database or other data source and maps the data into a target structure (cf. 121) with nodes (A, AA, . . . ABCB) so that an element (1111) of the original data source (111) is mapped to a first node (1211 in FIG. 1, "1$^{st}$ N" in FIG. 4). In case the source is modified, mapping component 410 maps updated data (112) from the updated data source (112) into the updated target structure (122, ontology).

Relation component 420 receives identification of the relation of the document with the first node (1211) in the target structure (121). In other words, the relation of the document with the first node in the target structure is established. FIG. 4 illustrates this interaction by an arrow from the content provider to component 420, for example, where the user adds a document annotation.

Relation change component 430 changes the relation (101/102) of the document (150), so that for data elements (1111) from the original data (111) that are mapped to the first node (1211) (but that are not available in the updated data source (112), explained above), the relation (101/102) is changed to a second node (1222, AB) in the updated target structure (122). For this operation, system 400 is usually not receiving input from the user, the relation is changed so that an updated ontology is available for the content retriever at any time (illustrated in FIG. 4 by up arrow)

There are strategies for this change: As mentioned, relation change component 430 can change the relation of the document 150 such that the second node 1222 is the parent node of the first node 1211. Or, the relation change component 430 can change that relation such that the second node 1222 is the root node of the first node 1211

The first part of the description focused on user interaction for a content provider role that sets document relations, and for a content retriever role that benefits from automatically modified relations.

In the following second part, the description now addresses alternative embodiments that involve user interaction in the change of the document/node relation. Simply stated, the user role of a first configuration user sets rules to identify the second node prior to the mapping updated source data, or the user role of a second configuration user identifies the second node substantially upon updating.

Returning shortly to FIG. 4, a dashed box illustrates the optional components node-rule user-interface (RULE-UI) 450 for the first user, and life user interface (LIFE_UI) 460. UIs 450 and 460 are activated prior or during mapping from updated sources.

In other words, computer system 400 optionally comprises a node-rule user-interface 450 that prior to operation of the mapping component 410 receives user interaction to identify an assignment scheme for the second node (prior to mapping). An example relating to the RULE-UI 450 will be described below in connection with FIG. 5.

Computer system 400 may include a configuration user interface that during the operation of mapping component 410 receives user interaction to identify the second node (during mapping)

FIG. 5 is a view of a user interface for the configuration user to select a node assignment scheme (e.g., for the RULE-UI 450), which the computer follows to change (operation 340) the relation (101) of the document (150) to the second node (1222). FIG. 5 shows this UI 450 as a drop down list 500. Persons of skill in the art can implement the UI 450 differently.

In the example, "move link to parent" corresponds to the embodiment illustrated in connection with FIG. 1 (e.g., the document relation changed to second node that is the parent node of the first node).

In the example, "move link to root" corresponds to the embodiment described above (e.g., the document relation changed to second node that is the root of the first node)

In the example, "remove link" corresponds to an embodiment where the document relation has to be deleted.

In the example "keep node and flag as expired", the document relation is modified so that the second node is the same as the first node, and there is an indication that the source data has changed.

In the example "decide case by case", the computer system 400 triggers an additional user interaction during mapping (operation 330) updated data (112) from the updated data source (112) into an updated target structure. In other words, this configuration user hands over the choice to the second configuration user. Being a data expert, that user identifies the second node substantially during the update.

To summarize, embodiments may help to combine the above-mentioned two aspects: an ontology facilitates building a user interface in a form that is appropriate to the skill of the users, and data is mostly a copy. The automatic node change during data updates addresses the potential risks of losing content that is created by user interaction with copied data. Thus, the data of the enterprise (or organization in general) can be better leveraged.

It may be convenient to limit the scope of data to be mapped into the ontology. For example, there could be an ontology for marketing experts (as in the example of FIG. 2), or an ontology for technical experts, but access-restricted data like pricing or human relations data can be ignored.

The above description often refers to the target structure (121/122) as ontology, but the teachings of the embodiments can be applied to structures that are ad-hoc hierarchies, glossaries, data dictionaries, informal hierarchies (so-called folksonomies), formal taxonomies, XML schema, Universal Modeling Language (UML) structures, and so on.

Although structures are explained in connection with nodes in a hierarchy, the structure can be very flat with all nodes referring to an imaginary root.

As mentioned, user tools to visualize a structure and to receive annotations are known, and exemplary may use the Net-Navigator.

As mentioned, the components of the above-described systems can be distributed. In such an approach, the system may be a composite application, with for example, the mapping component implemented by Intelligent Views KinFinity, or Business Objects Analytic Services ThingFinder. The document could be stored, for example, by SAP Records and Case Management.

SAP Business Warehouse (SAP BW) can be used to schedule updates and thereby to trigger the operation of the relation change component.

Having described an embodiment of the invention, those of skill in the art can implement it without the need of further explanation herein.

| LIST OF REFERENCES | |
|---|---|
| A, AA, . . . ABCB | nodes |
| 101 | relation |
| 111 | original data |
| 112 | updated data source |
| 121 | target structure |
| 122 | updated target structure |
| 150 | document |
| 300 | method |
| 310 | mapping original data into target structure |
| 320 | receiving identification of relation |
| 330 | mapping updated data from updated data source |
| 340 | changing relation |
| 400 | computer system |
| 410 | mapping component |
| 430 | relation change component |
| 450 | rule user interface |
| 460 | life user interface |
| 1211 | first node |
| 1222 | second node |
| 1111, 1112, 1113, 1114 | element of original data |

The invention claimed is:

1. A computerized method comprising:
mapping, using one or more processors coupled to memory, original data from an original data source to a target structure having a first plurality of nodes, so that a first element of the original data source is mapped to a first node of the first plurality of nodes;
receiving identification of a relation of a document with the first node of the target structure;
mapping updated data from an updated data source to an updated target structure having a second plurality of nodes; and
changing the relation of the document to a second node of the updated target structure in response to the first element from the original data that is mapped to the first node not being available in the updated data source, the updated target structure not including the first node, and the second node of the updated target structure corresponding to a second node of the target structure;
wherein, during the changing of the relation of the document to the second node of the updated target structure, the second node of the updated target structure is a parent node of the first node.

2. A computerized method comprising:
mapping, using one or more processors coupled to memory, original data from an original data source to a target structure having a first plurality of nodes, so that a first element of the original data source is mapped to a first node of the first plurality of nodes;
receiving identification of a relation of a document with the first node of the target structure;
mapping updated data from an updated data source to an updated target structure having a second plurality of nodes; and
changing the relation of the document to a second node of the updated target structure in response to the first element from the original data that is mapped to the first node not being available in the updated data source, the updated target structure not including the first node, and the second node of the updated target structure corresponding to a second node of the target structure;
wherein, during the changing of the relation of the document to the second node of the updated target structure, the second node of the updated target structure is a root node of the first node.

3. A computer system, comprising:
at least one processor in communication with each of the original data source and the updated data source, the processor configured to execute instructions included in a mapping component, a relation component, and a relation change component,
wherein the mapping component causes performance of operations to receive original data from the original data source and to map the original data to a target structure with nodes so that a first element of the original data is mapped to a first node of the target structure, the mapping component also to map updated data from an updated data source to an updated target structure;
the relation component causes performance of operations to receive identification of a relation of a document with the first node in the target structure; and
the relation change component causes performance of operations to change the relation of the document to a second node of the updated target structure in response to the first element from the original data that is mapped to the first node not being available in the updated data source, the updated target structure not including the first node, and the second node of the updated target structure corresponding to a second node of the target structure;
wherein the relation change component is to change the relation of the document such that the second node of the updated target structure is a parent node of the first node.

4. A computer system, comprising:
at least one processor in communication with each of the original data source and the updated data source, the processor configured to execute instructions included in a mapping component, a relation component, and a relation change component,
wherein the mapping component causes performance of operations to receive original data from the original data source and to map the original data to a target structure with nodes so that a first element of the original data is mapped to a first node of the target structure, the mapping component also to map updated data from an updated data source to an updated target structure;
the relation component causes performance of operations to receive identification of a relation of a document with the first node in the target structure; and
the relation change component causes performance of operations to change the relation of the document to a second node of the updated target structure in response to the first element from the original data that is mapped to the first node not being available in the updated data source, the updated target structure not including the first node, and the second node of the updated target structure corresponding to a second node of the target structure;
wherein the relation change component is to change the relation of the document such that the second node of the updated target structure is a root node of the first node.

5. A non-transitory machine-readable storage medium comprising instructions that, when executed by one or more processors of a machine, cause the machine to perform operations comprising:

mapping, using one or more processors coupled to memory, original data from an original data source to a target structure having a first plurality of nodes, so that a first element of the original data source is mapped to a first node of the first plurality of nodes;

receiving identification of a relation of a document with the first node of the target structure;

mapping updated data from an updated data source to an updated target structure having a second plurality of nodes; and changing the relation of the document to a second node of the updated target structure in response to the first element from the original data that is mapped to the first node not being available in the updated data source, the updated target structure not including the first node, and the second node of the updated target structure corresponding to a second node of the target structure;

wherein, during the changing of the relation of the document to the second node of the updated target structure, the second node of the updated target structure is a parent node of the first node.

6. A non-transitory machine-readable storage medium comprising instructions that, when executed by one or more processors of a machine, cause the machine to perform operations comprising:

mapping, using one or more processors coupled to memory, original data from an original data source to a target structure having a first plurality of nodes, so that a first element of the original data source is mapped to a first node of the first plurality of nodes;

receiving identification of a relation of a document with the first node of the target structure;

mapping updated data from an updated data source to an updated target structure having a second plurality of nodes; and changing the relation of the document to a second node of the updated target structure in response to the first element from the original data that is mapped to the first node not being available in the updated data source, the updated target structure not including the first node, and the second node of the updated target structure corresponding to a second node of the target structure;

wherein, during the changing of the relation of the document to the second node of the updated target structure, the second node of the updated target structure is a root node of the first node.

* * * * *